(12) United States Patent
Losi et al.

(10) Patent No.: US 6,253,263 B1
(45) Date of Patent: Jun. 26, 2001

(54) SYSTEM WITH LOGIC GATES HAVING A PROGRESSIVE NUMBER OF INPUTS CONNECTED TO A FIRST CONNECTION MATRIX RECEIVING SIGNALS TO BE ARBITRATED FROM PERIPHERAL DEVICES

(75) Inventors: Marco Losi; Sergio Pelagalli, both of Milan (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/176,534

(22) Filed: Oct. 21, 1998

(30) Foreign Application Priority Data

Oct. 29, 1997 (EP) .................................................. 97830553

(51) Int. Cl.[7] ...................................................... G06F 13/26
(52) U.S. Cl. ............................. 710/43; 710/40; 710/240; 710/244; 710/264
(58) Field of Search .................................. 710/40, 41, 43, 710/49, 240, 244, 264, 265

(56) References Cited

U.S. PATENT DOCUMENTS

| | | | |
|---|---|---|---|
| 3,919,692 | * 11/1975 | Kronies et al. | 710/244 |
| 4,417,302 | * 11/1983 | Chimienti et al. | 710/264 |
| 4,831,586 | * 5/1989 | Nakagawa et al. | 365/49 |

FOREIGN PATENT DOCUMENTS

| | | | |
|---|---|---|---|
| 0 262 608 A1 | 9/1987 | (EP) | G06F/13/26 |
| 0 576 764 A1 | 6/1992 | (EP) | G06F/13/364 |

OTHER PUBLICATIONS

"Programmable Priority Circuit," IBM Technical Disclosure Bulletin, vol. 11, No. 8, Jan. 1969, pp. 920–921.

* cited by examiner

Primary Examiner—Thomas Lee
Assistant Examiner—Ilwoo Park
(74) Attorney, Agent, or Firm—Allen, Dyer, Doppelt, Milbrath & Gilchrist, P.A.

(57) ABSTRACT

A peripheral device connecting system with priority arbitration includes a connection matrix connected to a plurality of peripheral devices capable of transmitting a signal to be arbitrated, e.g., an interrupt enable signal. The connection matrix includes first and second connection matrices connected to each other through a plurality of logic gates having a progressive number of inputs for transmitting in parallel a plurality of signals to be arbitrated. A connection matrix for a microcontroller-emulating chip includes a peripheral device connecting system with priority arbitration.

16 Claims, 2 Drawing Sheets

SYSTEM WITH LOGIC GATES HAVING A PROGRESSIVE NUMBER OF INPUTS CONNECTED TO A FIRST CONNECTION MATRIX RECEIVING SIGNALS TO BE ARBITRATED FROM PERIPHERAL DEVICES

FIELD OF THE INVENTION

This invention relates to a connection system with priority arbitration, and more particularly, to a programmable peripheral device connecting system for processing parallel signals to be arbitrated.

BACKGROUND OF THE INVENTION

As is well known, integrated circuits or microcontroller chips are designed in custom configurations for a final user's own requirements. Thus, a problem arises that the assembly process of the individual chip must be optimized to yield a finished product which best suits a specific application of interest to the final user, thereby doing away with redundant subsystems.

For this purpose, an individual chip is obtained from families of modular systems which can be likened to libraries of components comprising sets of macrocells adapted to perform certain basic functions. By assembling an appropriate and suitable number of macrocells selected from the same family, a single on-chip integrated system can be provided. The final user is then able to use the chip for developing an application of interest, from both the hardware and software viewpoints. Unfortunately, the delivery time for a custom-finished chip to the final user is rather long, e.g., several months.

This has prompted a demand for a need to emulate the chip, particularly the operation of the microcontroller therein, so that the final user can start developing his own application and carry on the development work in parallel with the physical making of the integrated device. Thus, there is a need to provide an emulation chip that closely resembles the system which is to be integrated on the chip product for ultimate delivery to the final user.

The emulation chip is, therefore, an integrated circuit which contains the core, all the peripheral devices, and all the gates available to a family of macrocells for microcontrollers. Each peripheral device can be activated or inactivated to make the microcontroller configuration of the emulation chip similar to that of the microcontroller of the final chip. This is provided by selecting certain gates and peripheral devices from all those available.

Thus, it is a matter of providing an emulation chip with programmable physical and logical connections, specifically between functional modules and interfacing gates. For this purpose, programmable devices must be provided in the emulation chip which can establish all possible connections between chip components. In particular, a system for interconnecting the peripheral devices is required which can handle their interrupt requests simultaneously.

A prior approach to this problem has been to use daisy chain connections which allow one signal to be shared with priority arbitration. In particular, the signal to be arbitrated is an interrupt signal. For this purpose, the CPU is connected to the peripheral devices directly by means of an interrupt line. The interrupt line carries an enable signal which is generated by the CPU to indicate that the CPU is ready for an interrupt to be delivered to a peripheral device. A connection matrix of the daisy chain type is a hardware device which can arbitrate the priority schedule for the various peripheral devices. However, this known approach cannot be applied to an emulation chip, wherein the priority schedule for the peripheral devices cannot be known in advance, but is to be decided upon by the final user.

There is a need to provide a peripheral connecting device which has structural and functional features so as to allow the arbitration of signals, specifically interrupt signals from the peripheral devices to the CPU, to be programmed. Another need is to provide a connection device with priority arbitration for chip emulating circuits operating at a comparable speed to that of the chip being emulated.

SUMMARY OF THE INVENTION

A programmable connection device includes at least one connection matrix of a daisy chain type which can process in parallel signals to be arbitrated. In particular, interrupt enable signals from the peripheral devices are arbitrated in parallel.

The invention specifically relates to a peripheral devices connecting system with priority arbitration, comprising at least a connection matrix connected to a plurality of peripheral devices capable of transmitting a signal to be arbitrated. The invention also relates to a special connection matrix for a microcontroller-emulating chip which includes at least a peripheral devices connecting system with priority arbitration as above. Finally, the invention relates to a method of connecting, with priority arbitration, signals to be arbitrated issuing from a plurality of peripheral devices.

In particular, but not solely, the invention relates to a chip capable of emulating a microcontroller using libraries of macrocells provided in the chip and connected via connection matrices, and the description that follows will make reference to this field of application only for convenience of illustration.

BRIEF DESCRIPTION OF THE DRAWINGS

The features and advantages of a device according to the invention will be apparent from the following description of an embodiment thereof, given by way of non-limitative examples with reference to the accompanying drawings. In the drawings.

DETAILED DESCRIPTION OF THE PREFERRED EMBODIMENTS

Figure 1:
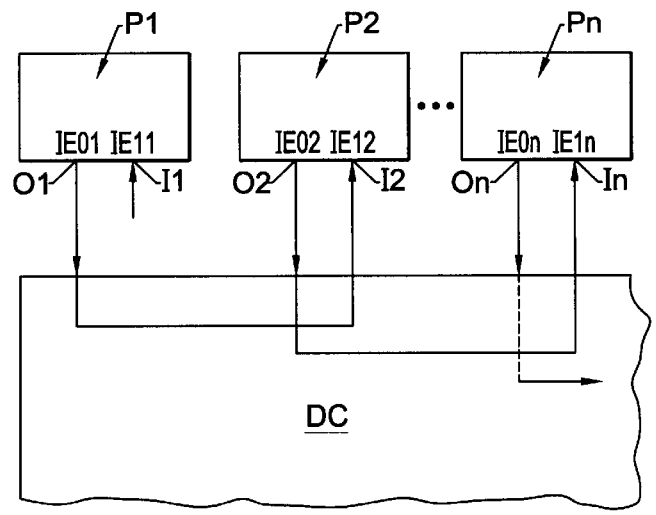
FIG. 1 shows schematically, according to the prior art, application of a connection matrix to an emulation chip.

An emulation chip is an integrated circuit which contains the core, all the peripheral devices, and all the gates that are available to a family of macrocells for microcontrollers. Depicted schematically in FIG. 1 is the transmission of a signal to be arbitrated according to the prior art. In particular, interrupt enable signals IE01–IE0n are transmitted among a plurality of respective peripheral devices P1–Pn.

A priority schedule must be established for the requests of interrupts from the peripheral devices P1–Pn with the core having highest priority. An emulation chip should be capable of changing the priority schedule of the interrupt signals according to a configuration being emulated. The final configuration of the priority schedule for the peripheral devices connected to the chip is configured for the final user.

There are two basic connections which can be established among the peripheral devices P1–Pn; a series connection or a parallel connection. When the peripheral devices P1–Pn are connected in series, more specifically, their interrupt signals, a single connection matrix DC is used. This matrix is similar to a conventional connection matrix as shown in FIG. 1. Such a connection matrix comprises n-by-n cells. In this case, however, an interrupt enable signal for the CPU has to reach all the peripheral devices P1–Pn and each time return to the connection matrix DC for being delivered to the next peripheral device. Due to the large size of the emulation chip, the delay introduced by the connection lines is quite substantial and will, therefore, affect the speed of the whole chip. The invention is a connection system that includes a pair of connection matrices of the daisy chain type having n-by-n cells interconnected through a series of n logic gates PL1–PLn. In particular, the logic gates are of the AND type with a progressive number of inputs that are "paralleling" the transmission of the interrupt enable signal from the peripheral devices P1–Pn.

Figure 2:
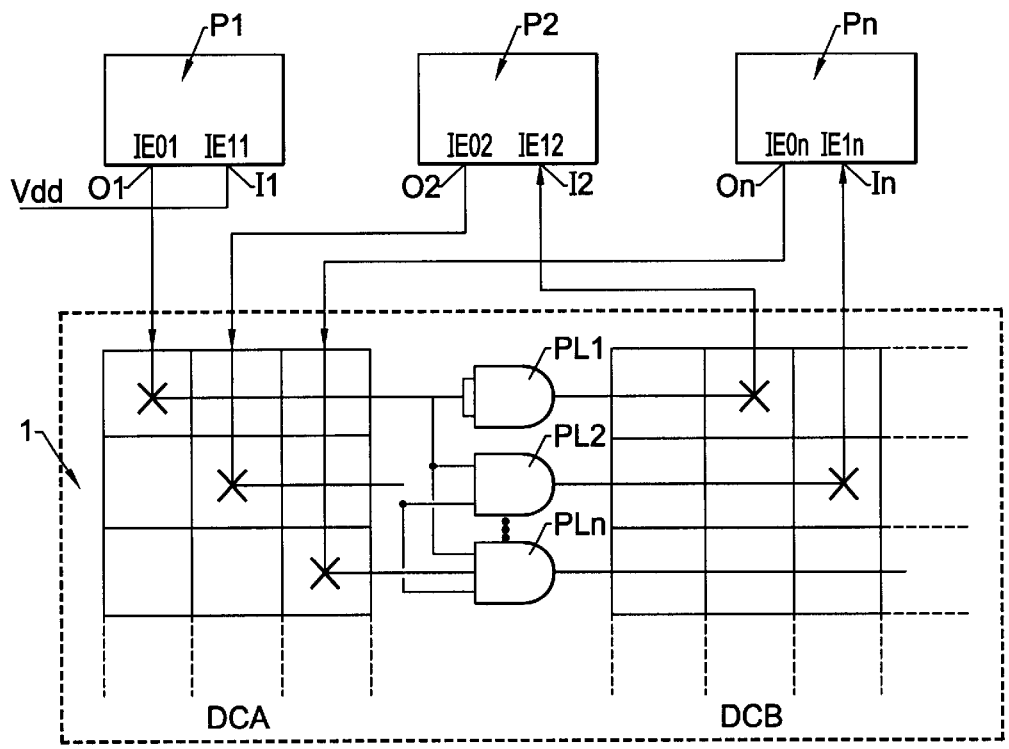
FIG. 2 shows schematically a connection device with priority arbitration according to the invention.

A connection system 1 with priority arbitration according to the invention is shown schematically in FIG. 2. The connection system 1 comprises a first matrix DCA connected directly to the inputs of a plurality of peripheral devices P1–Pn and through a plurality of logic gates PL1–PLn to a second matrix DCB, itself outputting directly to the peripheral devices P1–Pn. In particular, each peripheral device P1–Pn has an interrupt enable output terminal 01–0n for providing a first interrupt enable signal IE01–IE0n and an interrupt enable input terminal I1–In for receiving a second interrupt enable signal IE11–IE1n.

The interrupt enable output terminals O1–On are connected to the first matrix DCA, and the interrupt enable input terminals I1–In are connected to the second matrix DCB. The first DCA and second DCB matrices are in turn connected to each other through a plurality of logic gates PL1–PLn having a progressive number of inputs. The priority schedule for the peripheral devices is selected in the first matrix DCA. A progressive number is shown in the figure for simplicity. In general, the priority schedule for the peripheral devices is set by the configuration of the connections of the first matrix DCA to the logic gates PL1–PLn.

The first interrupt enable signal IE01, which is generated by the peripheral device P1 to the first matrix DCA, is applied to an input of the first logic gate PL1, and to the other logic gates PL2–PLn. The second interrupt enable signal IE02, which is generated by the peripheral device P2 to the first matrix DCA, is applied to an input of the second logic gate PL2, and to the other logic gates PL3–PLn. The remainder of the peripheral devices P3–Pn are connected in a similar fashion. In this way, a "paralleling" of the interrupt enable signals from the peripheral devices is obtained.

The priority arbitration principle of the connection system 1 according to the invention is explained in the following paragraphs. A generic peripheral device Pi (with 0<i<n) generates an interrupt enable signal IE0 which is always at a first logic value, e.g., a one, and only goes to a second logic value, e.g., a zero, when the peripheral device Pi issues a request for interrupt. It will be appreciated by one skilled in the art that AND logic complemented values could be substituted by an appropriate configuration of OR gates. Thus, upon a request for interrupt being issued from a peripheral device Pi, the situation is as follows:

IE0(1); IE0(2), IE0(i−1)=1

IE0(i)=0

IE0(i+1); IE0(I+2); . . . IE0(n)=1

The interrupt enable signal IE0(i) disables all the logic gates associated with peripheral devices Pi+1, Pi+2, . . . , Pn having lower priorities. In this way, the delay in the propagation of the interrupt enable signal can be significantly reduced compared to the series connection previously described. Advantageously in this invention, there are two matrices DCA, DCB with n cells per side, plus a set of n logic gates PL1–PLn with a number of respective inputs varying between 1 and n. The matrices DCA, DCB are, therefore, of limited rank, and their limitations mainly concern their size and the signal propagation delay through them.

A disadvantage of using several different pairs of connection matrices can be appreciated by considering that each of them would require one row decoding circuit, one column decoding circuit, and input and output circuits. In view of the size of the matrices required, these control circuits would occupy an area equal to or larger than the area of the memory cells comprising the emulation chip. In addition, providing matrices of such a small size is also a disadvantage from the standpoint of address space.

Figure 3:
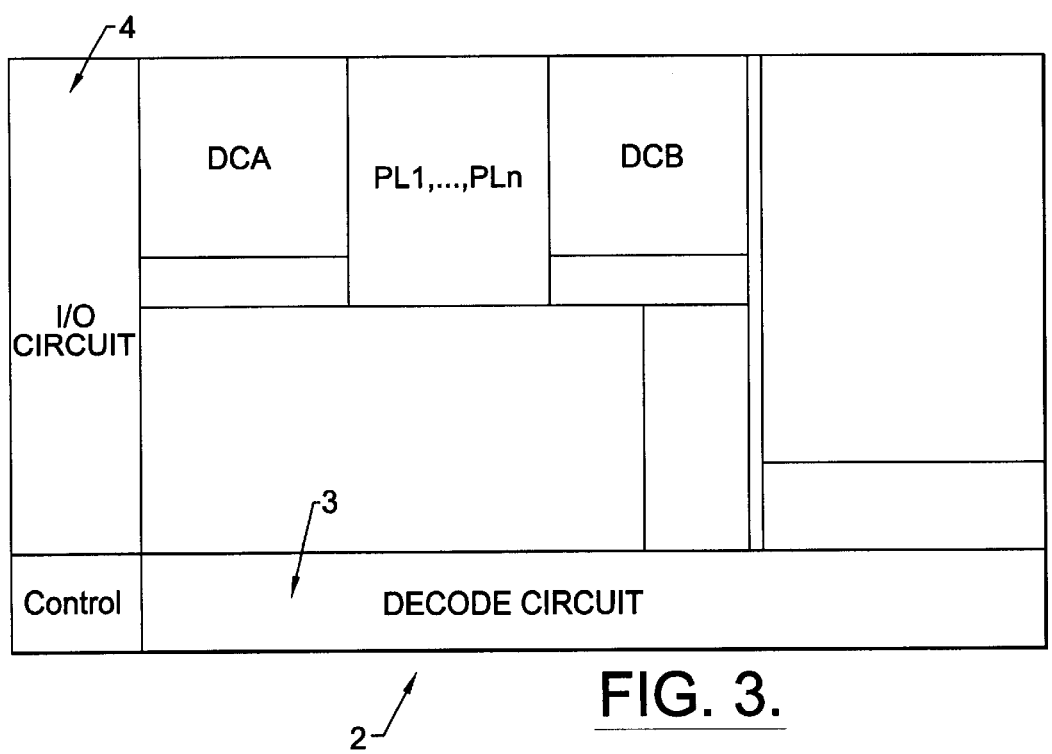
FIG. 3 shows a special connection matrix for an emulation chip comprising a connection device with priority arbitration according to the invention.

The matrices DCA and DCB, as well as the logic gates PL1–PLn connecting them, are included in a single special connection matrix 2 of the emulation chip, as shown schematically in FIG. 3. In this way, the decode 3 and input/output 4 circuits are merged in a single circuit except for a few minor functional modifications due to the addresses comprising a smaller number of bits.

The necessary logic gates PL1–PLn for connecting the matrices DCA and DCB have at most n inputs for handling the priority schedule. These gates are formed of logic gates belonging to a reference library, wherein the logic gates with a large number of inputs are formed by assembling several logic gates together to produce a desired logic function. Thus, the area occupied by the logic gates PL1–PLn is set beforehand, since they all belong to a definite library and have a definite layout.

As shown in FIG. 3, the need to have several connection matrices, as well as decode and input/output circuits, integrated to the special connection matrix leaves a large number of memory cells unused due to the dimensional inconsistency of adjacent components. Advantageously in this invention, the logic gates PL1–PLn replace some memory cells within the special connection matrix. It now matters to know the number of cells that are to be removed to later decide upon the composition of the overall matrix. Accordingly, it will be convenient to not only set the area for the logic gates, but also how many memory cells are to be eliminated. There are, however, restrictions for including components into the matrix. They are as follows:

1) the distributed locations of the input and output terminals of the logic gates;

2) the presence of a large number of metallization lines, which form the bit lines and power supply lines for the memory cells of the special connection matrix 2; and 3) the size of the connection matrices DCA, DCB. Thus, the final choice for the layout of the logic gates PL1–PLn should take these restrictions into account.

Accurate simulations have been performed for the special connection matrix 2 to verify the signal transmission delay and the circuit operation. In fact, the matrices DCA and DCB require very fast propagation times because they have to handle the circuit priority schedule.

As illustrated in FIGS. 1 and 2, an interrupt enable signal, e.g. IE0i, is transmitted along a first metal line section corresponding to a connection of the peripheral device Pi to the first matrix DCA. This signal IE0i is applied as an input to the first matrix DCA. Once the interrupt signal passes through the matrix DCA, it first goes through one of the n AND gates, in particular PLi, then the second matrix DCB, and along a second metal line section corresponding to a connection to the next peripheral device Pi+1. In the worse case, by the time the outgoing signal from the topmost row in the first matrix is connected to the last logic gate, the delay in the signal propagation would be rather large. This situation can be improved by having a last inverter positioned after the second matrix DCB, so as to improve the driving capacity of the last stage.

It should be noted that the first outgoing lines from the first matrix DCA have a rather large load including a certain number of logic gates and the long connection lines required to reach the gates. On the other hand, the last outgoing lines from the matrix are connected to few logic gates (in the extreme, the n-th line is connected to a single gate), and consequently, the connection lines are fairly short ones.

Advantageously in this invention, the connection system 1 with priority arbitration implements a connection of the daisy chain type having a priority configuration which is software-programmable. The connection system also has a delay which can be compared with that of a conventional daisy chain type connection having a preset priority configuration that is hardware implemented.

The invention has been described in relation to the enabling of an interrupt signal. It should be understood, however, that a connection system with priority arbitration according to the invention can be used to handle priority arbitrations of any type. Accordingly, this priority arbitration system, while generated by the specific requirements of an emulation chip can be applied to any circuit involving priority arbitration.

That which is claimed is:

1. A peripheral devices connecting system with priority arbitration, comprising:
    at least one connection matrix connected to a plurality of peripheral devices, each peripheral device capable of transmitting a signal to be arbitrated, said at least one connection matrix comprising
        a first connection matrix having a plurality of respective inputs connected to the plurality of peripheral devices for receiving a plurality of signals to be arbitrated,
        a plurality of logic gates having a progressive number of inputs connected to outputs of the first connection matrix for transmitting in parallel the plurality of signals to be arbitrated, and
        a second connection matrix having a plurality of inputs connected to outputs of the plurality of logic gates, and a plurality of respective outputs connected to the plurality of peripheral devices.

2. A peripheral devices connecting system according to claim 1, wherein the plurality of signals to be arbitrated are interrupt enable signals.

3. A peripheral devices connecting system according to claim 1, wherein each of the plurality of peripheral devices comprises an enable output terminal for providing a first signal to be arbitrated, and an enable input terminal for receiving a second signal to be arbitrated, the enable output terminals being connected to the first connection matrix and the enable input terminals being connected to the second connection matrix.

4. A peripheral devices connecting system according to claim 1, wherein a signal to be arbitrated from one of the peripheral devices is applied by the first connection matrix to a corresponding logic gate, and to each logic gate having a progressive number of inputs greater than the corresponding logic gate.

5. A peripheral devices connecting system according to claim 1, wherein the first connection matrix is connected to the plurality of logic gates to set a priority schedule of the plurality of peripheral devices.

6. A microcontroller emulation chip comprising:
    at least one connection matrix connected to a plurality of peripheral devices, each peripheral device capable of transmitting a signal to be arbitrated, said at least one connection matrix comprising:
        a first connection matrix having a plurality of respective inputs connected to the plurality of peripheral devices for receiving a plurality of signals to be arbitrated;
        a plurality of logic gates having a progressive number of inputs connected to outputs of the first connection matrix for transmitting in parallel the plurality of signals to be arbitrated; and
        a second connection matrix having a plurality of inputs connected to outputs of the plurality of logic gates, and a plurality of respective outputs connected to the plurality of peripheral devices.

7. A microcontroller emulation chip according to claim 6, wherein the plurality of signals to be arbitrated are interrupt enable signals.

8. A microcontroller emulation chip according to claim 6, wherein each of the plurality of peripheral devices comprises an enable output terminal for providing a first signal to be arbitrated, and an enable input terminal for receiving a second signal to be arbitrated, the enable output terminals being connected to the first connection matrix and the enable input terminals being connected to the second connection matrix.

9. A microcontroller emulation chip according to claim 6, wherein a signal to be arbitrated from one of the peripheral devices is applied by the first connection matrix to a corresponding logic gate, and to each logic gate having a progressive number of inputs greater than the corresponding logic gate.

10. A peripheral devices connecting system according to claim 6, wherein the first connection matrix is connected to the plurality of logic gates to set a priority schedule of the plurality of peripheral devices.

11. A microcontroller emulation chip according to claim 6, wherein at least one logic gate comprises a plurality of logic gates connected together.

12. A microcontroller emulation chip according to claim 6, wherein the plurality of logic gates replace a portion of memory cells within said at least one connection matrix.

13. A method for connecting with priority arbitration a plurality of peripheral devices, each peripheral device capable of transmitting a signal to be arbitrated, the method comprising the steps of:
    receiving a plurality of signals to be arbitrated via a first connection matrix having a plurality of respective inputs connected to the plurality of peripheral devices;
    transmitting in parallel the plurality of signals to be arbitrated via a plurality of logic gates having a progressive number of inputs connected to outputs of the first connection matrix; and
    receiving a plurality of arbitrated signals via a second connection matrix connected to an output of each the plurality of logic gates.

14. A method according to claim 13, wherein the plurality of signals to be arbitrated are interrupt enable signals.

15. A method according to claim 13, further comprising the step of changing a first logic value of a signal to be arbitrated to a second logic value when a corresponding peripheral device providing the signal issues an enable interrupt request.

16. A method according to claim 13, further comprising the step of disabling transmission of a signal to be arbitrated from all the peripheral devices having lower priority when the signal of a corresponding peripheral device goes to a second logic value.

* * * * *